US012362936B2

(12) United States Patent
Baibik et al.

(10) Patent No.: US 12,362,936 B2
(45) Date of Patent: Jul. 15, 2025

(54) METHODS AND SYSTEMS FOR AUTHENTICATING A CANDIDATE USER OF A FIRST AND AS SECOND ELECTRONIC SERVICE

(71) Applicant: YANDEX EUROPE AG, Lucerne (CH)

(72) Inventors: Sergey Vyacheslavovich Baibik, Sankt-Peterburg (RU); Oleg Vitalevich Isupov, Novosibirsk (RU); Evgeny Mikhailovich Primako, Moscow (RU); Eldar Timurovich Zaitov, Sankt-Peterburg (RU); Pavel Nikolaevich Vorobkalov, Volgograd (RU); Vitaly Borisovich Kholyavin, Balashikha (RU)

(73) Assignee: Y.E. Hub Armenia LLC, Yerevan (AM)

( * ) Notice: Subject to any disclaimer, the term of this patent is extended or adjusted under 35 U.S.C. 154(b) by 304 days.

(21) Appl. No.: 18/120,774

(22) Filed: Mar. 13, 2023

(65) Prior Publication Data

US 2023/0299958 A1    Sep. 21, 2023

(30) Foreign Application Priority Data

Mar. 15, 2022  (RU) ................................ 2022106749

(51) Int. Cl.
*H04L 9/32*  (2006.01)
*H04L 9/06*  (2006.01)

(52) U.S. Cl.
CPC .......... *H04L 9/3213* (2013.01); *H04L 9/0637* (2013.01); *H04L 9/0643* (2013.01)

(58) Field of Classification Search
CPC ... H04L 9/3213; H04L 9/0637; H04L 9/0643; H04L 2463/121; H04L 9/3242;
(Continued)

(56) References Cited

U.S. PATENT DOCUMENTS 10,902,016 B2    1/2021  Shamsutdinov
10,931,461 B2    2/2021  Dilles et al.
(Continued)

FOREIGN PATENT DOCUMENTS

RU    2308755 C2    10/2007
RU    2693330 C2    7/2019
RU    2740308 C1    1/2021

OTHER PUBLICATIONS

Russian Search Report dated Jul. 27, 2023 issued in respect of the counterpart Russian Patent Application No. RU 2022106749.
(Continued)

*Primary Examiner* — Mohammed Waliullah
(74) *Attorney, Agent, or Firm* — BCF LLP

(57) ABSTRACT

Method and system for authenticating a candidate user are disclosed. The method includes acquiring, by a second service from a first service, a request for a candidate User-Service Unique Identifier (USUID) associated with the candidate user. The candidate USUID is unique for a candidate user-first service pair. The method includes generating, by the second service, the candidate USUID, and sending a token indicative of the candidate USUID. In response to the candidate USUID matching a target USUID, the first service authenticates the candidate user as a target user without prompting the candidate user to provide additional information.

20 Claims, 8 Drawing Sheets

(58) Field of Classification Search
CPC ... H04L 9/40; H04L 63/0428; H04L 63/0807; H04L 63/0815; H04L 63/126; H04L 9/0866

See application file for complete search history.

(56) References Cited

U.S. PATENT DOCUMENTS

| | | |
|---|---|---|
| 11,012,374 B2 | 5/2021 | Momchilov et al. |
| 11,064,047 B1 | 7/2021 | Stegall et al. |
| 2011/0179469 A1* | 7/2011 | Blinn ............... H04L 63/0815 726/4 |
| 2015/0249540 A1* | 9/2015 | Khalil ................. H04L 63/18 713/158 |

OTHER PUBLICATIONS

Web Article, "Client IDs in AMP pages" retrieved on Feb. 9, 2023, https://developers.google.com/analytics/devguides/collection/amp-analytics/client-id#client_id_considerations.

Web Article, "Microsoft Account", retrieved on Dec. 10, 2021 from Wikipedia, https://en.wikipedia.org/wiki/Microsoft_account.

Web article "OAuth 2.0 Protocol" retrieved on Feb. 9, 2023 with the English translation obtained on Google Translate.

D. Hardt, Ed., "The OAuth 2.0 Authorization Framework", published in Oct. 2012, retrieved on Dec. 10, 2021, https://datatracker.ietf.org/doc/html/rfc6749.

Micah Silverman, "Implement the OAuth 2.0 Authorization Code with PKCE Flow", published on Aug. 22, 2019, retrieved on Dec. 10, 2021, https://developer.okta.com/blog/2019/08/22/okta-authjs-pkce.

* cited by examiner

METHODS AND SYSTEMS FOR AUTHENTICATING A CANDIDATE USER OF A FIRST AND AS SECOND ELECTRONIC SERVICE

CROSS-REFERENCE

The present application claims priority to Russian Patent Application No. 2022106749, entitled "Methods and Systems for Authenticating a Candidate User of a First and Second Electronic Service", filed Mar. 15, 2022, the entirety of which is incorporated herein by reference.

FIELD

The present technology relates to computer-based systems and methods for authenticating a user of a first and a second electronic service.

BACKGROUND

Electronic services implemented on user devices have been developed for a variety of purposes, including business, social, payment, and other purposes. These services or applications provide a Graphical User Interface (GUI) to present data to users as well as allowing the users to interact with the services. Applications or "apps" can be downloaded, for example, for security and authentication reasons, on the user device if the user wants to use embedded functionalities.

Recent developments in the field of web service systems, in particular social network service systems such as Facebook™ or commercial e-platforms such as Amazon™ allow a base web service system to interact with an external web service system, external to the base web service system. Such external web service systems may also be referred to as side web service systems. Mechanisms allowing a base web service system to interact with a side web service system have been developed and include, for example, allowing a user to log into the side web service system by providing her/his login associated with the base web service system.

U.S. Pat. No. 11,064,047 discloses techniques directed to accessibility of instant application data via an associated application.

SUMMARY

In some applications, it is desirable to limit or avoid providing data associated with an account of a user of a base web service system to a side web service system. For example, a service user may seek to better control sharing of data relating to personal information associated with her/his account on the base web service system, such data being stored in a memory of the base web service system. The problem of better controlling the sharing of data relating to personal information might be prevalent in contexts where the base web service system interacts with one or more side web service systems which the user might not know and/or trust as much as the base web service system.

Developers of the present technology have realized at least two issues associated with user authentication via a base web service system. Firstly, using a first service as a "gate" for accessing other services (e.g., authentication in an email service provides the user with possibility of authentication in a music services) is convenient for the user. However, it is undesirable to transfer personal information of the user directly to third-party web services. Such handling of personal information increases the risk of data leaks. Secondly, performing authentication based on known approaches involves sharing a user ID over a number of web services, resulting in the possibility of third-party services tracking the user via the user ID and sharing the user ID with other services.

The base service may be embodied as a "super app". Broadly speaking, a super app is a mobile application that provides multiple services including payment and financial transaction processing, for example, effectively becoming an all-encompassing commerce and communication online platform that embraces many aspects of personal and commercial life. In some implementations, the super app may be a marketplace of services and offerings, delivered via an in-house technology and through third-party integrations.

To better illustrate this, let it be assumed that a user wants to see a theatrical play in Moscow in a few days with friends. The user may need to switch between a number of applications on her phone for making this plan work. The user may need to coordinate the plan with her friends on WhatsApp™, buy tickets for the theatrical play on Ticketmaster™, book a ride to the play through YandexTaxi™, and after the play, pay each other back for drinks over Venmo™. In this example, a super app can "integrate" functionalities of all these apps into a single app for the user, therefore acting as a gatekeeper to a wide array of interactions people do online. Social media networks, for example, become increasingly important in the way users shop, bank, and entertain themselves.

In some embodiments, the developers of the present technology have devised methods and systems where the user may use his\her credentials of a base service to login into several client web service systems operating in association with the base service.

In other embodiments, a base service (e.g., the super app) may generate a User-Service Unique Identifier (USUID) for authenticating a user in a particular client service. It should be noted that the USUID is unique for a given user-client service pair. In further embodiments, the base service (e.g., the super app) may generate a Publisher specific Unique Identifier (PSUID) for authenticating a user with a particular publisher of a client service. The PSUID is unique for a given user-publisher pair.

In those embodiments where a given publisher controls more than one client service, the publisher may decide whether or not a same PSUID is used for more than one client services. For example, the publisher may decide that a same PSUID may be used for more than one client services, meaning that this PSUID is unique to a given user-publisher pair. In another example, the publisher may decide that different PSUIDs for the more than one client services, meaning that respective USUIDs will be used for respective client services and where a given USUID is unique to a given user-client service pair.

It is contemplated that user information and client information (and/or publisher information) may be receive and anonymized. The USUID may be generated based on such anonymized information about the user-client pair (and/or user-publisher pair). The user information may include the name of the user. Additionally, or alternatively, the user information may include a User Identifier (UID) that is unique the particular user. Additional data may be used for generating the USUID. The anonymization process may be achieved through encryption of the user information using an encryption algorithm.

In further embodiments, the USUID may be packaged into a "container" with a timestamp being indicative a period of time during which this USUID is valid. For example, the timestamp may be a moment in time that is equal to a time of creation of the container to which a pre-determined lifetime of the container is added. If the pre-determined lifetime of the container is exhausted, the client web service system requires to authenticate the user to ensure a secure user experience and/or may send a request to the base service to re-issue a "fresh" USUID. Packaging the USUID with such a timestamp may prevent fraudulent exploitation of stale USUIDs, even if a fraudulent agent has access to the stale USUID. In some embodiments, the USUID and the timestamp may be included in a payload of a JSON Web Token (JWT) transmitted from the base service to the client service.

Developers have realized that employing USUIDs as contemplated herein may allow authentication of a user in a client service via the base service without prompting the user to provide additional information for authentication purposes.

In a first broad aspect of the present technology, there is provided a method of authenticating a candidate user associated with a first service and a second service. The first service and the second service are executed on respective backend servers. An electronic device of the candidate user is communicatively couplable to the respective back-end servers over a communication network. The method comprises, at a given moment in time, acquiring, by the second service from the first service, a request for a candidate USUID associated with the candidate user currently attempting to access the first service. The first service is associated with a SUID. The candidate USUID is unique for a candidate user-first service pair. The SUID being unique for the first service. The method comprises, at a given moment in time, in response to the user having been previously authenticated in the second service, generating, by the second service, the candidate USUID by encrypting (i) user information of the candidate user authenticating the candidate user in the second service and (ii) the SUID. The method comprises, at a given moment in time, acquiring, by the first service from the second service, a token indicative of the candidate USUID and a signature. The method comprises, at a given moment in time, in response to validating the signature, comparing the candidate USUID acquired at the given moment in time against a target USUID associated with a target user of the first service acquired at an other moment in time. The other moment in time is before the given moment in time. The method comprises, at a given moment in time, in response to the candidate USUID matching the target USUID, authenticating, by the first service, the candidate user as the target user without prompting the candidate user to provide additional information.

In some embodiments of the method, the target user has been authenticated with the first service at the other moment in time, and the target USUID has been stored by the first service in response to authentication at the other moment in time.

In some embodiments of the method, the target user has been authenticated directly with the first service.

In some embodiments of the method, the target user has been authenticated with the first service indirectly in the second service.

In some embodiments of the method, the encrypting comprises encrypting, by the second service, the user information using a first secret key and the SUID as an initialization vector for a Galois/Counter Mode (GCM) algorithm.

In some embodiments of the method, the method further comprises generating, by the second service, the signature using a second secret key with a Hash Message Authentication Code (HMAC) algorithm.

In some embodiments of the method, the token is a JSON Web Token (JWT) having a header portion, a payload portion, and a signature portion. The USUID is inserted into the payload portion and the signature being inserted into the signature portion.

In some embodiments of the method, a timestamp value is further inserted into the payload portion, and the timestamps is indicative a period of time during which the USUID is valid.

In some embodiments of the method, the first service and the second service have a same operator.

In some embodiments of the method, an operator of the first service is different from an operator of the second service.

In a second broad aspect of the present technology, there is provided a system for authenticating a candidate user associated with a first service and a second service. The first service and the second service of the system are executed on respective backend servers. An electronic device of the candidate user is communicatively couplable to the respective back-end servers over a communication network. The system is configured to, at a given moment in time, acquire, by the second service from the first service, a request for a candidate User-Service Unique Identifier (USUID) associated with the candidate user currently attempting to access the first service, the first service being associated with a Service Unique Identifier (SUID), the candidate USUID being unique for a candidate user-first service pair, the SUID being unique for the first service. The system is configured to, at a given moment in time, in response to the user having been previously authenticated in the second service, generate, by the second service, the candidate USUID by encrypting (i) user information of the candidate user authenticating the candidate user in the second service and (ii) the SUID. The system is configured to, at a given moment in time, acquire, by the first service from the second service, a token indicative of the candidate USUID and a signature. The system is configured to, at a given moment in time, in response to validating the signature, compare the candidate USUID acquired at the given moment in time against a target USUID associated with a target user of the first service acquired at an other moment in time, the other moment in time being before the given moment in time. The system is configured to, at a given moment in time, in response to the candidate USUID matching the target USUID, authenticate, by the first service, the candidate user as the target user without prompting the candidate user to provide additional information.

In some embodiments of the system, the target user has been authenticated with the first service at the other moment in time, the target USUID having been stored by the first service in response to authentication at the other moment in time.

In some embodiments of the system, the target user has been authenticated directly with the first service.

In some embodiments of the system, the target user has been authenticated with the first service indirectly in the second service.

In some embodiments of the system, to encrypt comprises the system configured to encrypt, by the second service, the user information using a first secret key and the SUID as an initialization vector for a Galois/Counter Mode (GCM) algorithm.

In some embodiments of the system, the system is further configured to generate, by the second service, the signature using a second secret key in a Hash Message Authentication Code (HMAC) algorithm.

In some embodiments of the system, the token is a JSON Web Token (JWT) having a header portion, a payload portion, and a signature portion, the USUID being inserted into the payload portion and the signature being inserted into the signature portion.

In some embodiments of the system, a timestamp value is further inserted into the payload portion, the timestamps being indicative a period of time during which the USUID is valid.

In some embodiments of the system, the first service and the second service have a same operator.

In some embodiments of the system, an operator of the first service is different from an operator of the second service.

Various implementations of the present technology provide a non-transitory computer-readable medium storing program instructions for authenticating a service user having an account associated with a base web service system, the program instructions being executable by a processor of a computer-based system to carry out one or more of the above-recited methods.

Various implementations of the present technology provide a computer-based system comprising at least one processor and a memory storing program instructions for authenticating a service user having an account associated with a base web service system, the program instructions being executable by one or more processors of a computer-based system to carry out one or more of the above-recited methods.

In the context of the present specification, unless expressly provided otherwise, an "electronic device", a "computer-based system" and "a web service system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
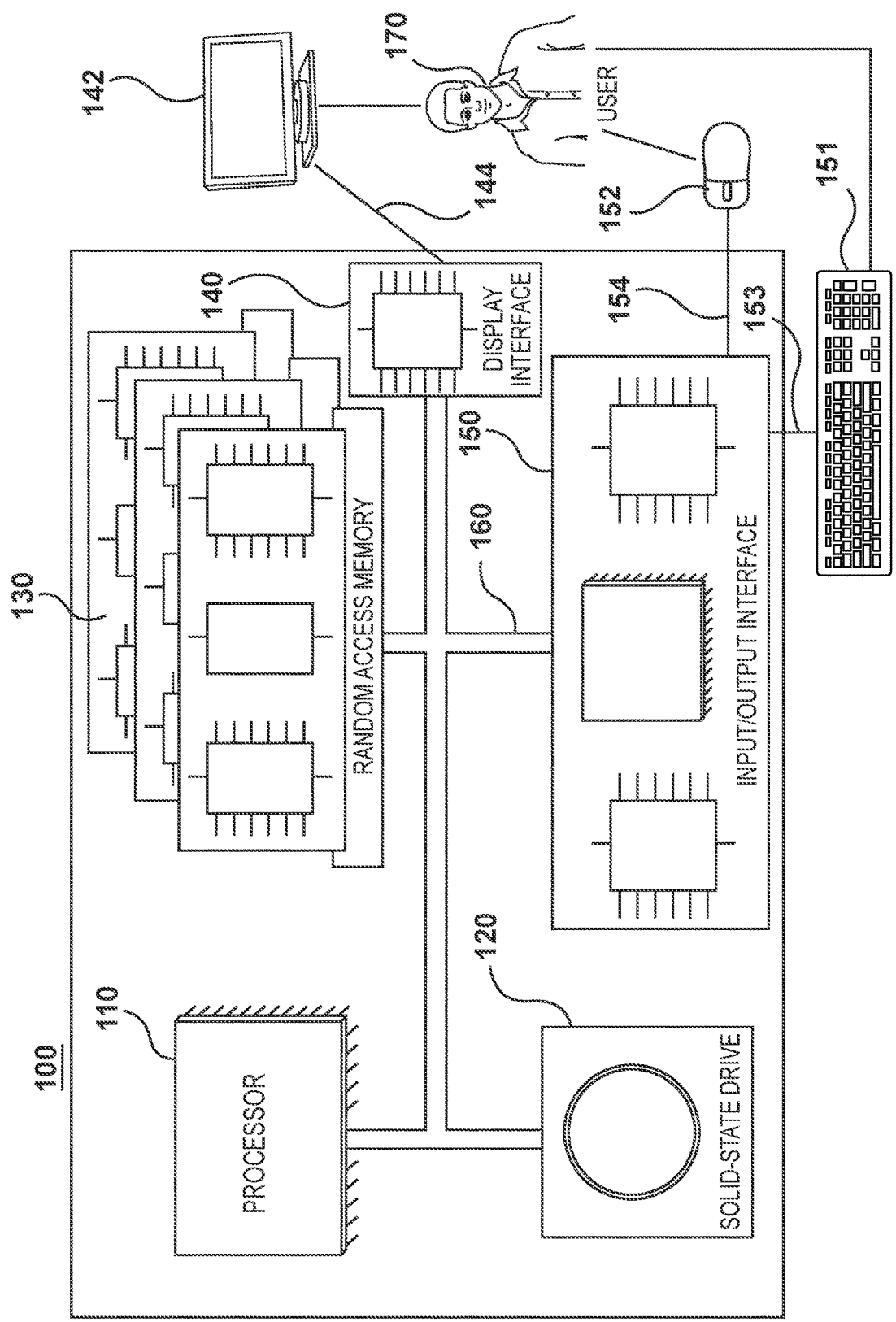
FIG. 1 p diagram of a computer-implemented method for authenticating a candidate user when indirectly accessing the first service system at a given moment in time via a second service system, in accordance with some embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a service user 170 (also referred to as a service user), and the input/output interface 150 may be coupled to a keyboard 151 (e.g. via a USB cable 153) and a mouse 152 (e.g. via a USB cable 154), each of the keyboard 151 and the mouse 152 being operable by the service user 170.

According to implementations of the present technology, the solid-state drive 120 stores program instructions suitable for being loaded into the random access memory 130 and executed by the processor 110 for authenticating a candidate user having an account associated with a base web service system. For example, the program instructions may be part of a library or an application.

Figure 2:
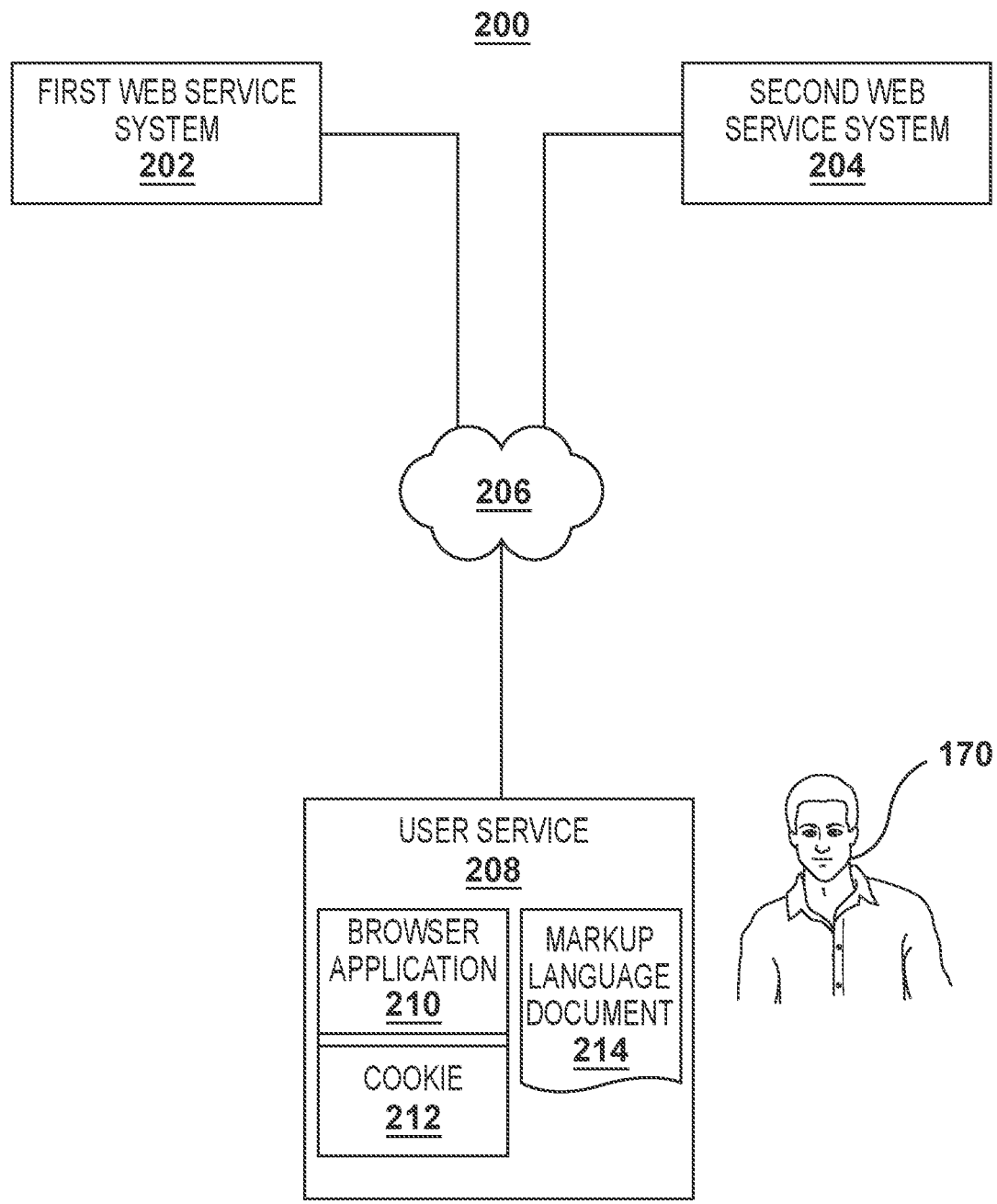
FIG. 2 is a schematic of a networked computing environment in accordance with some embodiments of the present technology.

In FIG. 2, there is shown a networked computing environment 200 suitable for use with some implementations of the present technology, the networked computing environment 200 comprising a first web service system 202, a second web service system 204, a user device 208 as well as a network 206 enabling these systems to communicate.

The first web service system 202 and the second web service system 204 may be systems providing web services to one or more service users 170 interacting with the first web service system 202 and/or the second web service system 204 via the user device 208. For example, the first web service system 202 and/or the second web service system 204 may include, without limitation, a social network service system (e.g., Facebook™, VK™), an email service system (e.g., Gmail™, Yandex.Mail™), an account management service (e.g., Yandex.Passport™), an information keeping service (e.g., Evernote™), a blog web service system (e.g., Twitter™) or an e-commerce service system (e.g., Amazon™, Expedia™).

It should be understood that, in some non-limiting embodiments, the first web service system 202 and the second web service system 204 may be both part of a common web service system offering at least two different web services. In this example, the first and second web service systems 202, 204 may be owned and/or operated by a same entity and/or offer two different web services both hosted under a common domain name (e.g., an email service system Yandex.Mail™ being a first web service and an account management service Yandex.Passport™ being a second web service, both services being hosted under a common domain name "Yandex").

On the contrary, in some other non-limiting embodiments, the first web service system 202 and the second web service system 204 may be each part of distinct web service systems offering at least two different web services. In this example, the first and second web service systems 202, 204 may be owned and/or operated by different entities and/or offer two different web services hosted under different domain names (e.g., an email service system Yandex.Mail™ being a first web service and an e-commerce service system Amazon™ being a second web service, both services being hosted under the different domain names "Yandex" and "Amazon").

It should also be understood, that, in some other non-limiting embodiments, the first and the second web service systems 202, 204 may each host one or more web services. For example, the first web service system 202 may host an email service system (Yandex.Mail™) and an account management service (e.g., Yandex.Passport™) while the second web service may host an information keeping service (e.g., Evernote™) and/or an e-commerce service system (e.g., Expedia™). It should also be understood, that, in some non-limiting embodiments, the first web service system 202 may be referred to as a side web service system and the second web service system 204 may be referred to as a base web service system while, in some other non-limiting embodiments, the first web service system 202 may be referred to as a base web service system and the second web service system 204 may be referred to as a side web service system.

The first and second web service systems 202, 204 may comprise one or more servers. Each server may comprise internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating via the network 206.

The user device 208 may interact with the first web service 202 and/or the second web service 208 by receiving input from the service user 170 and receiving and transmitting data via the network 206. The user device 208 may be, for example and without being limitative, a desktop computer, a laptop computer, a smart phone (e.g. an Apple iPhone™ or a Samsung Galaxy S5™), a personal digital assistant (PDA) or any other device including computing functionality and data communication capabilities. The user device 208 may comprise internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the first and second web services 202, 204 via the network 206.

In one non-limiting embodiment, the user device 208 displays content from the first and/or second web service systems 202, 204 by processing a markup language document 214 received from the first and/or second web service systems 202, 204. The markup language document 214 identifies content and one or more instructions describing formatting or presentation of the content. By executing the instructions included in the markup language document 214, a browser application 210 displays the identified content using the format or presentation described by the markup language document 214. In various embodiments, the markup language document 214 comprises a data file including extensible markup language (XML) data, extensible hypertext markup language (XHTML) data or other markup language data.

In other non-limiting embodiments, the user device 208 may also include a cookie 212 that contains data indicating whether the service user 170 of the user device 208 is logged into the second web service system 204. The cookie 212 may indicate whether the service user 170 is involved in an active session where the user device 208 exchanges data with the second web service system 204, providing that the service user 170 has an account associated with the second web service system 204.

It is contemplated that the a given web service system may include a backend portion and a frontend portion. The frontend portion of a given web service may be executed on an electronic device associated with a user, for example. The frontend may provide a Graphical User Interface (GUI) for a user to interact with the given web service. In some embodiments, a downloadable app dedicated to the given web service may be included in the frontend portion of the given web service. How a backend portion of a given web service system can be implemented will be described with reference to FIG. 3.

Figure 3:
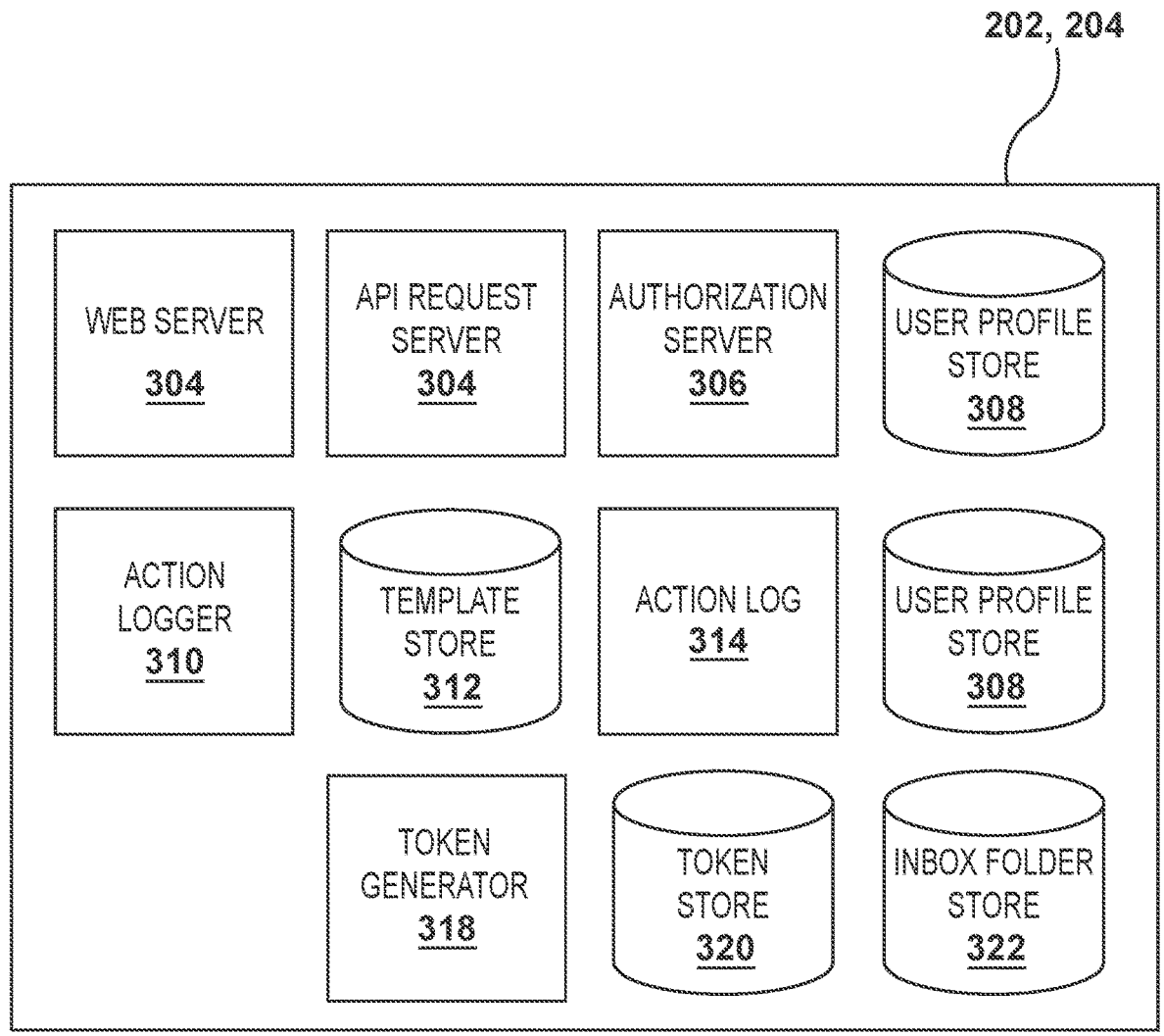
FIG. 3 is a schematic diagram of a web service system suitable for use with some implementations of the present technology.

FIG. 3 is a schematic diagram of a web service system suitable for use with some non-limiting implementations of the present technology. The diagram of FIG. 3 illustrates non-limiting embodiments of the first web service system 202 and/or the second web service system 204. For the purpose of easing description of the non-limiting embodiments reference is made to the first and second web service systems 202, 204 but it should not be inferred that the first and second web service systems 202, 204 have to be similar to be suitable for use with some implementations of the present technology. The first web service system 202 and the second web service system 204 may be dissimilar and/or may each deviate (partially or totally) from the web service system illustrated at FIG. 3 without departing from the scope of the present technology.

The first and second web service systems 202, 204 may comprise a web server 302, an Application Programming Interface (API) request server 304, an authorization server 306, a user profile store 308, an action logger 310, a template store 312, an action log 314, a connection store 316, a token generator 318, a token store 320 and/or an inbox folder store 322. In other embodiments, the first and second web service systems 202, 204 may include additional, fewer, or different modules for various applications. Conventional components such as network interfaces, security mechanisms, load balancers, failover servers, management and network operations consoles, and the like are not shown so as to not obscure the details of the system.

The web server 302 of the first web service system 202 may link the first web service system 202 to one or more user device and/or one or more external websites such as the user device 208 and/or the second web service system 204 via the network 206. The web server 302 serves web pages, as well as other web-related content, such as Java, Flash, XML, and so forth. The web server 302 may include a mail server or other messaging functionality for receiving and routing messages between the first web service system 202 and one or more user devices 208. The messages can be instant messages, queued messages (e.g., email), text and SMS messages, or any other suitable messaging format.

The API request server 304 of the first web service system 202 allows one or more external web service systems such as the second web service system 204 to exchange information with the first web service 202 by calling one or more APIs. Such exchange of information may be a sending of information from the first web service system 202 to the second web service system 204 and/or a sending of information from the second web service system 204 to the first web service system 202. Such exchange of information may be, for example but without being limitative, an authentication request, a token used to authenticate a candidate user and/or data associated with an action performed on the second web service system 204 as detailed in the paragraphs set forth below. The API request server 304 of the first web service system 202 may also allow the second web service system 204 to send information by calling APIs. For example, the second web service system 204 sends an API request to the first web service system 202 via the network 206 and the API request server 304 receives the API request. The API request server 304 processes the request by calling an API associated with the API request to generate an appropriate response, which the API request server 304 communicates to the second web service system 204 via the network 206.

The authorization server 306 of the first web service system 202 may contain logic to determine if certain information associated with a user can be accessed by a user's friends, external websites such as the second web service system 204 and/or other applications and entities. The authorization server 306 may enforce one or more privacy settings of the users of the first web service system 202. A privacy setting of a user determines how particular information associated with a user can be shared. The privacy setting comprises the specification of particular information associated with a user and the specification of the entity or entities with whom the information can be shared. Examples of entities with which information can be shared may include other users, applications, the second web service system 204 or any entity that can potentially access the information. The information that can be shared by a user may comprise user profile information like profile photo, phone numbers associated with the user, user's connections, actions taken by the user such as adding a connection, changing user profile information and the like.

In some embodiments, the authorization server 306 of the first web service system 202 may manage one or more lists of actions that the second web service system 204 may be authorized to perform on the first web service system 202. In some embodiments, the one or more lists of actions may be stored in the user profile store 308, the connection store 316, the token store 320 and/or the inbox folder store 322. Other data storage locations may also be equally used without departing from the scope of the present technology.

A list of actions may be associated with an account of a user of the first web service system 202 and may be generated further to the user being prompted to establish a list of actions she/he wishes to authorize the second web service system 204 to perform. For example, such actions may include conducting a transaction (e.g., a financial transaction for cases where the second web service system 204 is an e-commerce service system), sending data generated further to a conduct of a transaction (e.g., sending a confirmation receipt further to a buying of a plane ticket for cases where the second web service system 204 is a travel agency web service system), sending data generated further to an interaction of a user with the second web service system 204, etc.

In alternative non-limiting embodiments, the authorization server 306 of the second web service system 204 may contain logic to determine if an action can be performed for the service user based on certain parameters, such as a token received from the first web service system 202. As set forth above in connection with the authorization server 306 of the first web service system 202, the action may include conducting a transaction (e.g., a financial transaction for cases where the second web service system 204 is an e-commerce service system), sending data generated further to a conduct of a transaction (e.g., sending a confirmation receipt further to a buying of a plane ticket for cases where the second web service system 204 is a travel agency web service system), sending data generated further to an interaction of a user with the second web service system 204, etc.

The action logger 310 may be capable of receiving communications from the web server 302 about user actions on and/or off the first web service system 202 and/or the second web service system 204. The action logger 310 may populate the action log 314 with information about user actions, allowing the first web service system 202 to track various actions taken by its users within the first web service 202 and/or outside of the first web service 202 such as within the second web service 204. Any action that a particular user takes may be associated with each user's profile, through information maintained in the action log 314 or in a similar database or other data repository.

Examples of actions taken by a user within the first web service system 202 that are identified and stored may include, for example, adding a connection to another user, sending a message to another user, reading a message from another user, viewing content associated with another user, attending an event posted by another user or other actions interacting with another user. When a user takes an action within the first web service system 202, the action is recorded in the action log 314. In one embodiment, the first web service system 202 maintains the action log 314 as a database of entries. When an action is taken within the first web service system 202, an entry for the action is added to the action log 314.

Additionally, user actions may be associated with an entity outside of the first web service system 202, such as the second web service system 204 that is separate from the first web service system 202. For example, the action logger 310 receives data describing a user's interaction with the second web service system 204 received from the web server 302. Examples of actions where a user interacts with the second web service system 204, or an object associated therewith, include a user expressing an interest in an external website or another entity, a user posting a comment within the second web service system 204, a user posting to the first web service system 202 a Uniform Resource Locator (URL) or other identifier associated with the second web service system 204, a user attending an event associated with the second web service system 204, a user conducting a transaction on the second web service system 204, or any other action by a user that is related to the second web service system 204 or an object associated therewith. Thus, the action log 314 may include actions describing interactions between the first web service system 202 and the second web service system 204 that is separate from the first web service system 202.

The token generator 318 may be capable of generating a token (e.g., OAuth token) authenticating a service user of the first web service system 202. In some embodiments, the token may be an indication allowing to uniquely identify the service user of the first web service system 202 without disclosing any of the information associated with the account of the user. In some alternative embodiments, the token may be an indication allowing to uniquely identify the service user of the first web service system 202 while disclosing some, but not all, of the information associated with the account of the user. The token may be generated based on data associated with an account of the service user 170, such as, for example, data stored in the user profile store 308, the connection store 316 and/or the token store 320. In some embodiments, the token may comprise first data anonymously authenticating the service user 170 and second data identifying an action that the second web service system 204 is authorized to perform for the service user 170. In some embodiments, a token generated by the first web service system 202 may be stored in the token store 320 of the first web service system 202 and/or the token store 320 of the second web service system 204.

Additionally, the first web service system 202 maintains data about objects with which a user may interact with using the first web service system 202. To maintain this data, the user profile store 308 and the connection store 316 store instances of the corresponding type of objects maintained by the first web service system 202. Each object type has information fields that are suitable for storing information appropriate to the type of object. For example, the user profile store 308 contains data structures with fields suitable for describing a user's profile. When a new object of a particular type is created, the first web service system 202 initializes a new data structure of the corresponding type, assigns a unique object identifier to it, and begins to add data to the object as needed. This might occur, for example, when a user becomes a user of the first web service system 202, the first web service system 202 generates a new instance of a user profile in the user profile store 308, assigns a unique identifier to the user profile, a password associated with the unique identifier, and begins to populate the fields of the user profile with information provided by the user.

As described in connection with FIG. 2, for instances where the service user 170 has an account associated with the first web service system 202 and/or the second web service system 204, the account associated with the first web service system 202 and/or the second web service system 204 may comprise personal information about the service user 170 such as, without being limitative, user's name, user's address, user's financial information (e.g., bank account information, credit card information, etc.).

In other embodiments, the account does not need to comprise personal information per se but rather one or more links to personal information. Yet in other embodiments, the account may comprise other information, such as, in the example of a social network web service, a social network or a social graph identifying other users or entities with which the service user 170 maintain relationships. In some embodiments, the personal information and the other information may be stored in the user profile store 308. Other locations for storing the personal information and the other information may be used without departing from the scope of the present technology.

In an embodiment, the service user 170 may access to the account associated with the first web service system 202 by providing, for example but without being limitative, a login and/or password uniquely identifying the service user 170 with the first web service system 202. It should be understood that other means of uniquely identifying the service user 170 with the first web service system 202 may be used without departing from the scope of the present technology. Such other means may include, for example, biometric information such as fingerprint, iris and/or facial recognitions.

In one embodiment, an object type may be used to identify a template from the template store 312 used to display content received, for example, from a web page from a second web service system 204. For example, a template may be used to display content from a web page associated with an object that is a confirmation receipt generated further to a transaction conducted by the service user 170 on the second web service 204 (e.g., a receipt confirming the buying of a plane ticket).

The connection store 316 includes data structures suitable for describing a user's connections to other users, connections to the second web service system 204, or connections to other entities. The connection store 316 may also associate a connection type with user's connections, which may be used in conjunction with the user's privacy setting, further described above, to regulate access to information about the user. Data stored in the connection store 316, the user profile store 308 and the action log 314 allows the first web service system 202 to identify relationships between different objects.

The inbox folder store 322 may include data structures suitable for storing data received from the second web service system 204 as a result of an action undertaken by the second web service system 204. Examples of data received from the second web service system 204 may include data associated with the conduct of a transaction (e.g., a financial transaction for cases where the second web service system 204 is an e-commerce service system). As it could be appreciated by a person skilled in the art of the present technology, the inbox folder store 322 may provide a centralized repository of data received from web service systems external to the first web service system 202 such as the second web service system 204.

Having described, with reference to FIG. 1 to FIG. 3, some non-limiting example instances of the first and second web service systems 202, 204 for use in connection with the problem of authenticating a service user associated with the second web service system 204, we shall now describe a general solution to this problem with reference to FIG. 4 to FIG. 8.

Broad Framework

Developers of the present technology have devised methods and systems that generate a specific unique identifier for a user-service pair during authenticating a user of a client service and which is associated with a second service. This specific unique identifier is referred to as a "USUID".

The broad framework for the authentications process includes generation of USUID based on a Service Unique ID (SUID) and information about a user. This USUID is a globally unique identifier for the user-client service pair. In other embodiments, the broad framework may include globally unique identifiers for the user-publisher pair and where the publisher hosts more than one client service.

The broad framework may include a step of generating two special "keys" to be employed during an encryption process and a signature process, respectively. The broad framework may include determining a "seed" value for the user. The initial seed value may be "0" for example, but the user may trigger an update of the seed value. Such an action may be used to invalidate all previously issued USUIDs for this user.

The broad framework may include a step of encrypting a user's information and the seed value using the first key. The user information to be encrypted may be a user's name, and/or a user unique ID (UUID) associated with the user. In this example, the SUID (e.g., ID of the client service) may be used during the encryption process as an initialization vector.

In some embodiments, the USUID may be generated using an Advanced Encryption Standard (AES) Galois/Counter Mode (GCM) algorithm. Broadly speaking, AES is a specification for the encryption of electronic data established by the U.S. National Institute of Standards and Technology (NIST) in 2001. Broadly speaking, in cryptography, Galois/Counter Mode (GCM) is a mode of operation for symmetric-key cryptographic block ciphers which can be useful for its performance. GCM throughput rates high-speed communication channels can be achieved with inexpensive hardware resources. The operation is an authenticated encryption algorithm designed to provide both data authenticity (integrity) and confidentiality. GCM can be defined for block ciphers with a block size of 128 bits. Galois Message Authentication Code (GMAC) is an authentication-only variant of the GCM which can form an incremental message authentication code. Both GCM and GMAC can accept initialization vectors of arbitrary length.

The broad framework may include a step of signing the encrypted data using the second key. In this example, a Hash Message Authentication Code (HMAC) algorithm may be used for signing the encrypted data. Broadly speaking, in cryptography, an HMAC is a specific type of message authentication code (MAC) involving a cryptographic hash function and a secret cryptographic key. HMAC may be used to simultaneously verify both the data integrity and authenticity of a message. HMAC can provide authentication using a shared secret instead of using digital signatures with asymmetric cryptography. It trades off the need for a complex public key infrastructure by delegating the key exchange to the communicating parties, who are responsible for establishing and using a trusted channel to agree on the key prior to communication. However, other suitable algorithms may be used during the signature process without departing from the scope of the present technology.

The broad framework may include a step of transmitting the USUID and the signature using a JSON Web Token (JWT). Broadly speaking, a JWT is a proposed internet standard for creating data with optional signature and/or optional encryption whose payload holds JSON that asserts some number of claims. These tokens are signed either using a private secret or a public/private key. For example, a server could generate a token that has the claim "logged in as administrator" and provide that to a client. The client could then use that token to prove that it is logged in as an admin. The tokens can be signed by one party's private key (usually the server's) so that party can subsequently verify the token is legitimate. If the other party, by some suitable and trustworthy means, is in possession of the corresponding public key, they too are able to verify the token's legitimacy. The tokens are designed to be compact, URL-safe, and usable especially in a web-browser single-sign-on (SSO) context. JWT claims can be used to pass identity of authenticated users between an identity provider and a service provider, or other suitable of claims as required by business processes. JWT relies on other JSON-based standards such as JSON Web Signature and JSON Web Encryption.

The broad framework may include a step of registering the client service. In some implementations, the operator/publisher of the client service may need to register an OAuth application. The operator may perform registration on the OAuth server in order to receive tokens for Yandex™ users, for example. Also, a minimum required set of scopes may be specified, a SUID (e.g., client ID) may be acquired by operator in response to completion of the registration process, a "redirect_uri" that has been generated based on pre-determined rules (e.g., "turboapp://<turbo_app_id>") may be added. This SUID may be prescribed in the client's configurations. Broadly speaking, "scopes" is a computer-implemented mechanism for limiting a service's access to a user's account. For example, a service can request one or more scopes, and this information may then be presented to the user in the consent screen, and the access token issued to the service may be limited to the scopes granted. Broadly speaking, a "redirect_uri" is the URI to which a system posts an authorization code. The code can then be exchanged for an access token which one can use to authenticate subsequent API calls.

The broad framework may include a step of configuring the client service. In some implementations, the operator of the base service may have discretion with regard to specific configurations of the client service. For example, a given client service may be configured statically by prescribing SUID (e.g., client ID) in the config, and/or dynamically by calling a special JS-API method.

The broad framework may include a step of initiating authorization. In some implementations, the client service may call an "authorize" type method of the JS-API of the base service. The base service acquires the SUID (e.g., client ID) of the client service, and potentially a second ID (publisher ID), to form the "redirect_uri" based on the pre-determined rules.

The base service may access a method of an Account Manager (AM) with the SUID and potentially a secondary ID as parameters. It can be said that the AM is part of the base service (e.g., super app). It can be said that the AM is part of the second service. The AM may be a client library. The AM may carry out the authorization process (e.g., account selection, password entry, registration, etc.), may request from the user permissions specified in the OAuth application of the client service (e.g., if the user has not confirmed them earlier, for example). If successful, it may send an OAuth token as a callback (for requests to the API) and a JWT token (for offline acquisition of information about the user).

The broad framework may include a step of operating the client service. To obtain information about the user, the client service can locally verify the JWT token. In some embodiments, the base service may perform this function, in which case the base service may transmit a json object with the relevant data. The nature of the data to be transmitted may depend on inter alia the set of scopes of the OAuth application. In some embodiments, the base service can use the OAuth token when interacting with APIs of other client services if the OAuth application has the necessary scopes. In additional embodiments, the client service can use the JWT token for authorization in its backend. The JWT token may be signed by the secret of the OAuth application, which only its backend "knows", so the backend can verify the authenticity of the JWT token provided by the frontend of the client service.

The broad framework may include a step of logging out. In some implementations, the client service may call a "logout" type method of the base service. The base service can proxy this request to a method of the AM. The AM may locally delete saved tokens and, optionally, may revoke the tokens on the server. Additionally, or alternatively, the user can log out via the web interface.

In the context of the present technology, a given client service may acquire a USUID for local storage following a first access thereto by the user 170.

In some embodiments, the user 170 can be said to initially access the given client service "directly" via a frontend portion of the client service (e.g., application running on the user device) and/or via a browser application. To better illustrate this, let it be assumed that the client service is a given e-platform and the base service is a super app integrated functionalities of the e-platform. In this example, initial access to the e-platform may be performed directly via a dedicated app on the user device and/or via a browser application. How a direct initial access to the client service can be performed will be described with reference to FIG. 4.

In other embodiments, the user 170 can be said to initially access the given client service "indirectly" via the base service. In this example, initial access to the e-platform may be performed by the user accessing the super app, and using functionalities of the e-platform in the super app. How an indirect initial access to the client service can be performed will be described with reference to FIG. 5.

Direct Initial Authentication

Broadly speaking, during an initial direct access, an OAuth flow may be used to authenticate the user, and a USUID may then be generated by the second service, which is sent via a JWT token to the backend of the first service for local storage. It is contemplated that when a user is attempting to access a given service, the service may perform one or more authentication and authorization procedures during which the user may be prompted to provide information.

Figure 4:
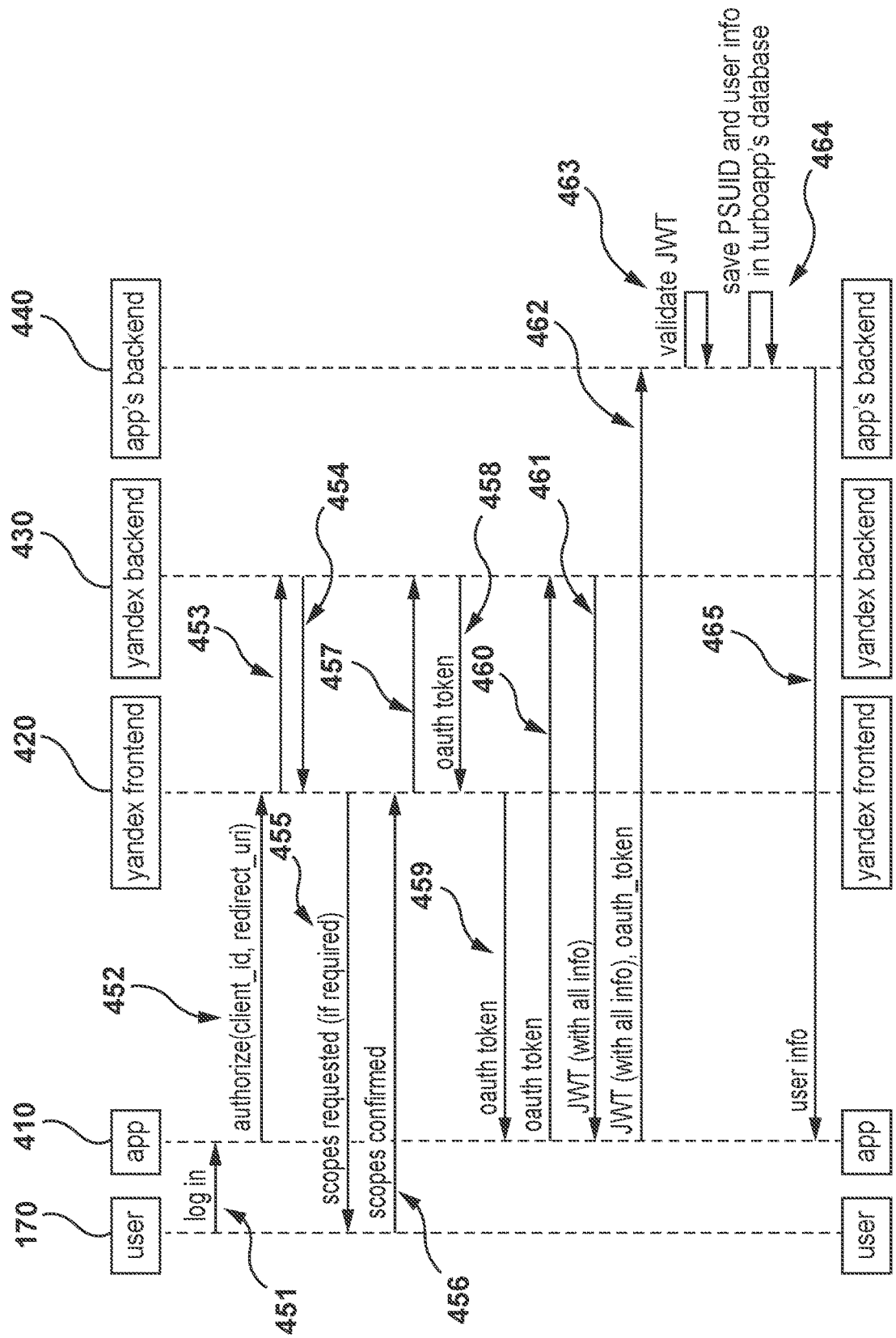
FIG. 4 depicts a non-limiting example of a computer-implemented method performed during a direct initial authentication of the user in accordance with some embodiments of the present technology.

In one implementation, a user attempting to initially access a given service directly may correspond to the user adding an item to her cart in the e-platform accessed via the browser application. With reference to FIG. 4, there is depicted a non-limiting example of a computer-implemented method performed during a direct initial authentication of the user 170.

At step 451, the user 170 may attempt to login with the front end 410 of the first service. At step 452, the frontend 410 transmits an authorization request to the frontend 420 of the second service. The authorization request may carry a SUID (e.g., client ID) associated with the first service, and a "redirect_uri" information. At steps 453 and 454, the frontend 410 may communicate with the backend 430 of the second service. If required, the frontend 420 may request confirmation of scopes from the user 170 via step 455 and may receive confirmation via step 456. For example, the user may be prompted with an interface (e.g., a window) for performing confirmation. At step 457, the frontend 420 may send a request for an OAuth token to the backend 430 which generates the OAuth token and sends it via step 458 to the frontend 420. The frontend 420 may transmit the OAuth token to the frontend 410 via step 459. At step 460, the frontend 410 may employ the OAuth token when requesting information from the backend 430. Upon receipt of the OAuth token, the backend 430 may generate a JWT token with the requested information and send it via step 461 to the frontend 410. At step 462, the front end 410 may send the JWT token carrying information and the OAuth token to the backend 440 of the first service. At step 463, the backend 440 may be configured to validate the JWT token (e.g., verify the signature encompassed in the JWT token). At step 464, the backend 440 may store the USUID and user info (e.g., name of the user) carried in the payload of the JWT token. As a result, the USUID and the user info associated with the user 170 may be stored locally by the backend 440 of the first service. In one implementation, the user info may be a name of the user. At step 465, the backend 440 may send the user info to the frontend 410. It can be said that the user 170 is authenticated with the frontend 410 and the frontend 410 may use the user info for displaying information to the user 170. For example, the user's name may be displayed via a GUI.

It is contemplated that in addition to storing the USUID on the backend of the first service, the backend of the first service may further store user info (e.g., user's name) for later use when the user 170 is to be authenticated during a subsequent attempt at accessing the first service.

Indirect Initial Authentication

Broadly speaking, during an initial indirect access, an OAuth flow may be used to authenticate the user, and a USUID may then be generated by the second service, which is sent via a JWT token to the backend of the first service for local storage. It is contemplated that when a user is attempting to access a given service, the service may perform one or more authentication and authorization procedures during which the user may be prompted to provide information.

Figure 5:
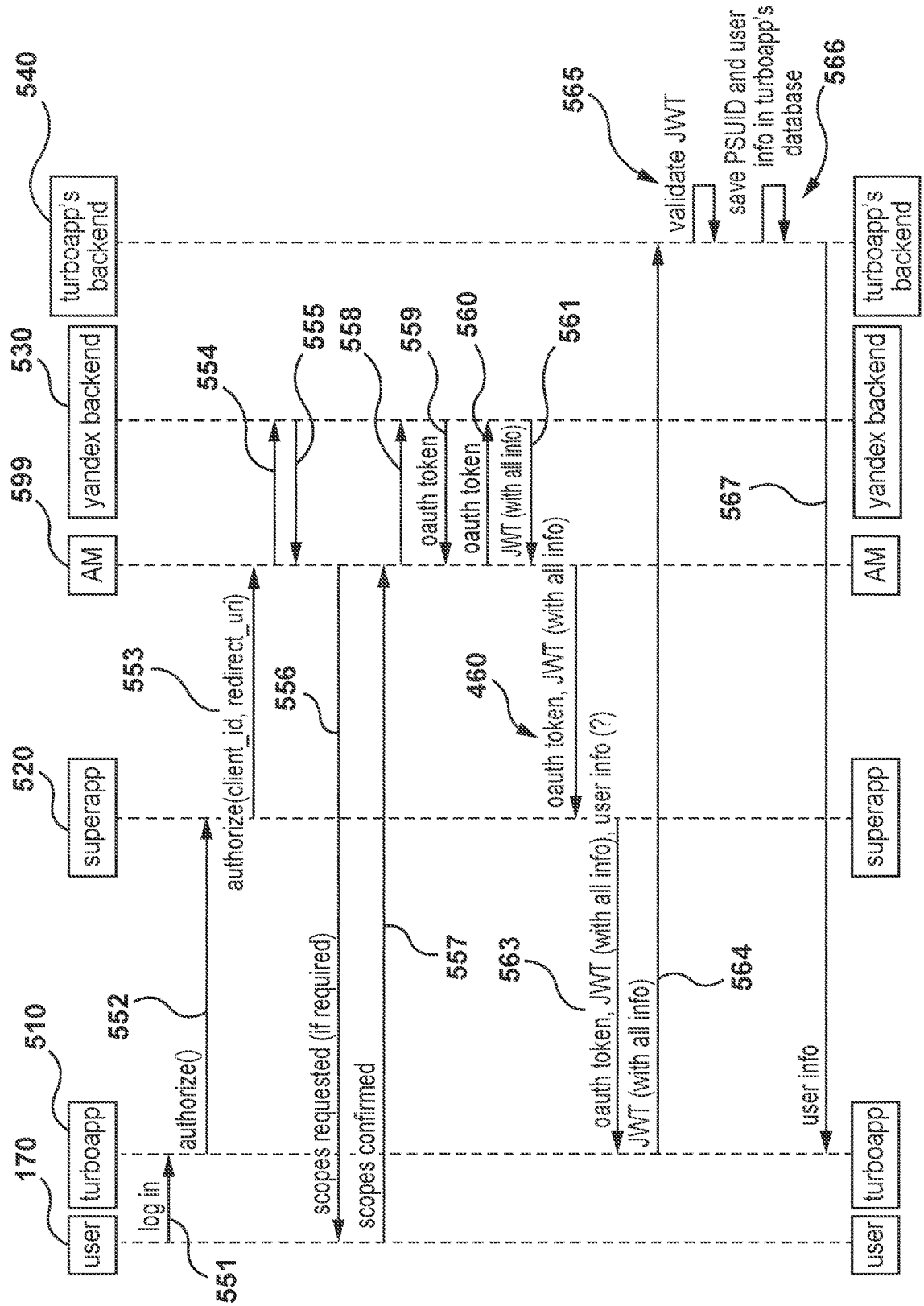
FIG. 5 depicts a a non-limiting example of a computer-implemented method performed during an indirect initial authentication of the user in accordance with some embodiments of the present technology.

In one implementation, a user attempting to initially access a given service indirectly may correspond to the user executing the super app, and in the super app, accessing one or more functionalities of the e-platform service. With reference to FIG. 5, there is depicted a non-limiting example of a computer-implemented method performed during an indirect initial authentication of the user 170.

The user 170 may attempt to log in with the first service inside the second service. At steps 551, the user 170 attempts to login and the frontend 510 of the first service sends an authorization request to the frontend of the second service where the user is trying to log in. At step 553, the frontend 520 transmits an authorization request to the AM 599. The authorization request may carry a SUID (e.g., client ID) associated with the first service, and "redirect_uri" information. At steps 554 and 555, the AM 599 may communicate with the backend 530 of the second service. If required, the AM 599 requests confirmation of scopes from the user 170 via step 556 and may receive confirmation via step 557. At step 558, the AM 599 may send a request for an OAuth token to the backend 530 which generates the OAuth token and sends it via step 559 to the AM 599. At step 560, the AM 599 may employ the OAuth token when requesting information from the backend 530. Upon receipt of the OAuth token, the backend 530 may generate a JWT token with the requested information and send it via step 561 to the AM 599. At step 562, the AM 599 sends the JWT token carrying information and the OAuth token to the frontend 520 of the second service. At step 563, the front end 520 may send to the frontend 510 the OAuth token, the JWT token, and user info via a single request, for example. At step 564, the frontend 510 may send the JWT token to the backend 540 of the first service. At step 565, the backend 540 may be configured to validate the JWT token (e.g., verify the signature encompassed in the JWT token). At step 566, the back end 440 may store the USUID and user info (e.g., name of the user) carried in the payload of the JWT token. As a result, the USUID and the user info associated with the user 170 may be stored locally by the back end 540 of the first service. At step 567, the back end 540 may send the user info to the front end 510.

Irrespective of whether the first access to the first service has occurred in accordance with the embodiment depicted in FIG. 4 or in accordance with the embodiment depicted in FIG. 5, the backend of the first service locally stores the USUID associated with the user-first service pair and user info of the particular user.

Overview of a Subsequent Authentication

Figure 6:
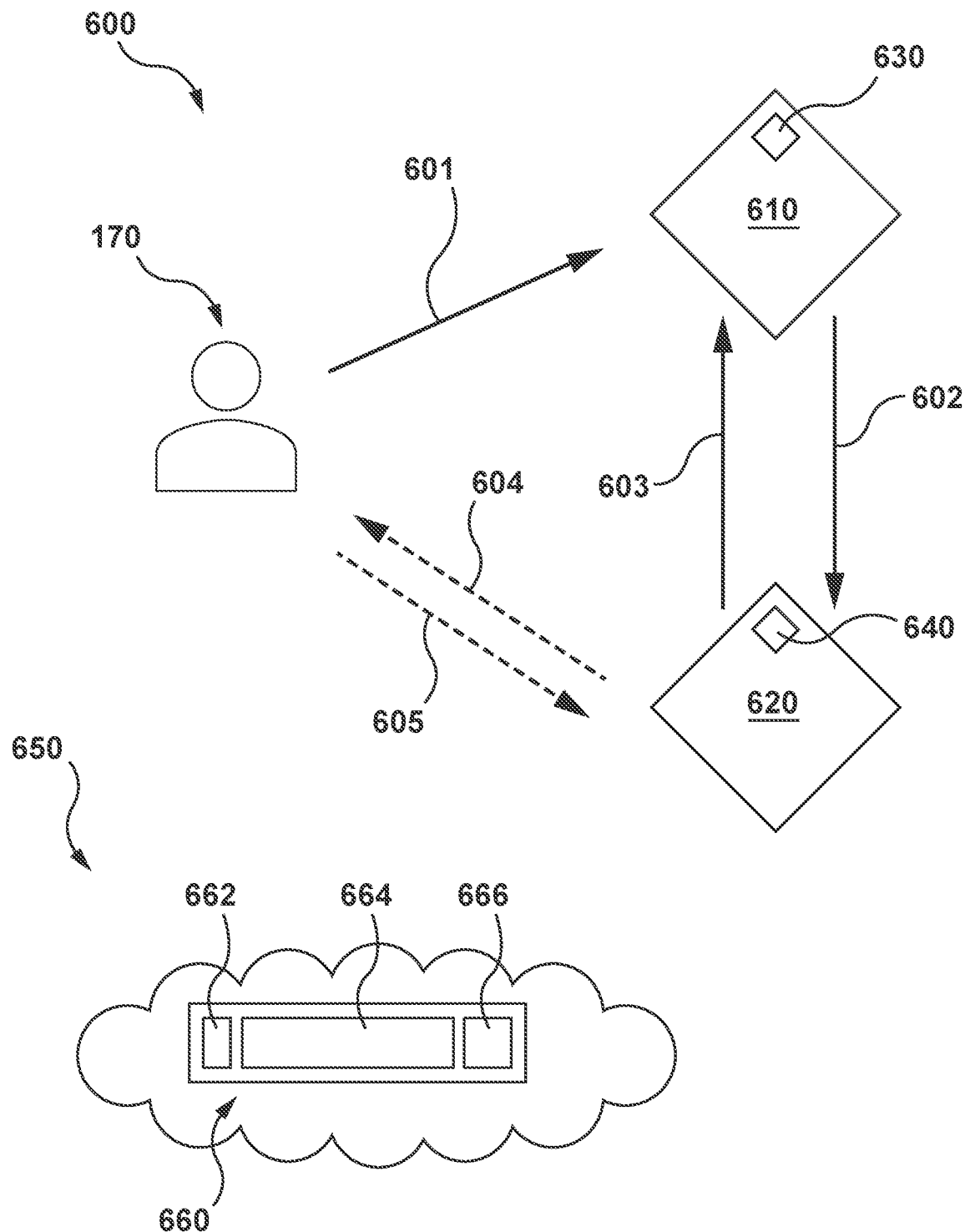
FIG. 6 is a schematic diagram of a computer-implemented method for authenticating the candidate when accessing the first service system at an other moment in time, in accordance with some embodiments of the present technology.

With reference to FIG. 6, there is depicted an overview of a flow for a subsequent access to the first service by the user

170. It is contemplated that one or more authentication procedures and one or more authorization procedures may be performed during a subsequent access to the first service.

At step 601, the user 170 attempts to access the first service 610. At step 602, the first service 610 sends a request for a USUID to the second service 620. In some embodiments, if the user 170 is not currently authenticated with the second service 620, the second service 620 may request at step 604 user credentials from the user 170. In response to being prompted for provision of user credentials, the user 170 may provide the user credentials to the second service 620. In further embodiments, when the user 170 is authenticated with the second service 620, the second service 640 is configured to perform one or more computer-implemented procedures 640 for generating the USUID. At step 603, the second service 620 transmits the USUID to the first service 610.

In some embodiments of the present technology, the second service 620 may generate a token 660 and transmit the token 660 as part of the step 603. In some embodiments, this token 660 may be a JWT token having a header 662, a payload 664, and a signature 666. For example, the USUID and a potential timestamp may be carried in the payload 664.

In additional embodiments, when the first service 610 receives the USUID from the second service 620, the first service 610 is configured to perform computer-implemented procedures 630 for confirming that the USUID has been received from a trustworthy service, and for validating the USUID during authentication of the user 170. For example, the first service 610 may confirm the signature 666 in the token 660 by using a secret key. In this example, the first service may generate a confirmation signature using the secret key and information in the payload 664 and compares to the signature 666 in the token 660. Upon confirmation, first service 610 may compare the USUID from the payload 664 of the token 660 to the USUID stored locally by the first service 610 in response to an initial access thereby to the first service 610. If there is a match, the user 170 is authenticated. Otherwise, the user 170 may use the first service under an "anonymous" status, for example.

Detailed Flow of a Subsequent Authentication

Figure 7:
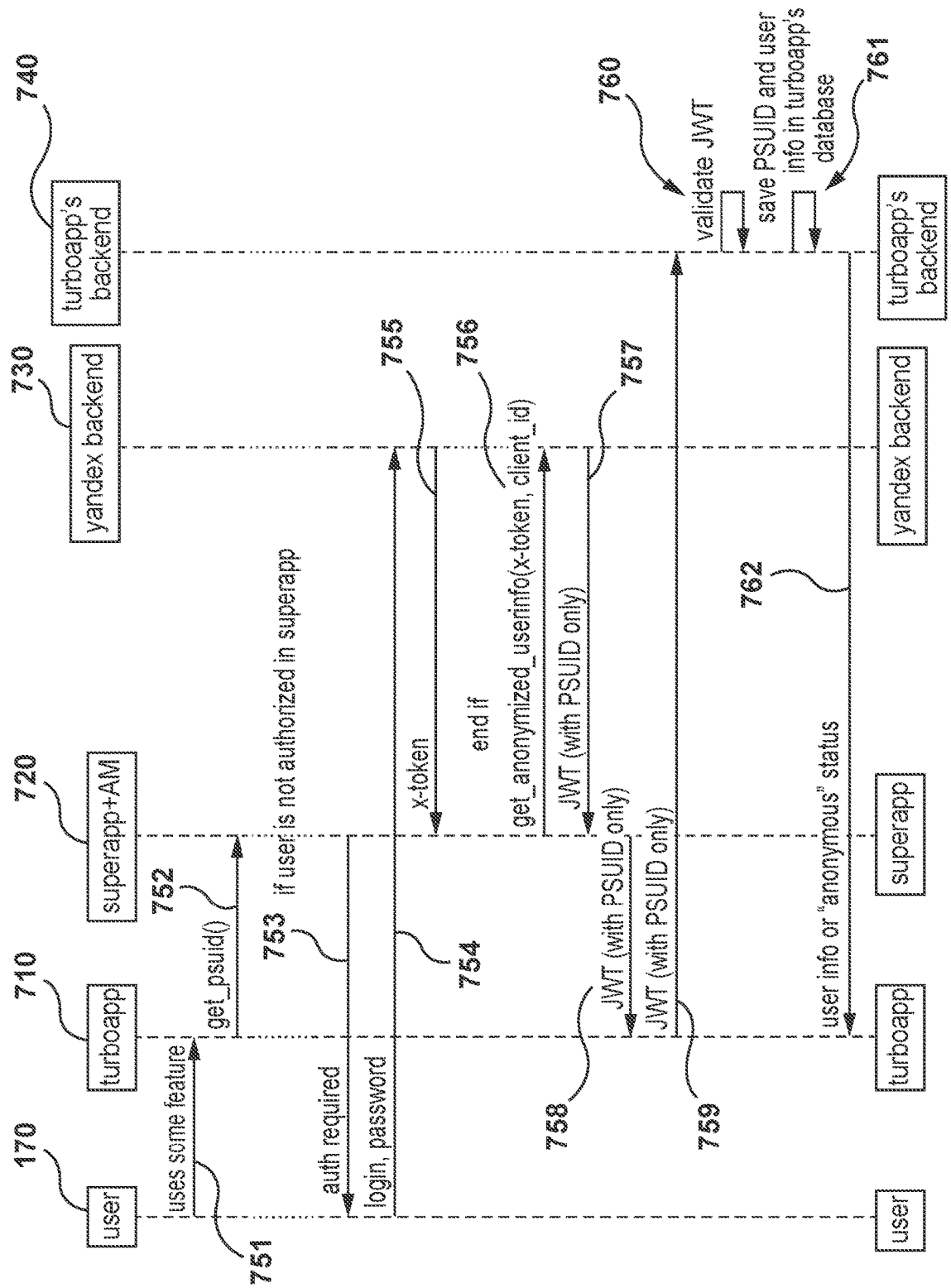
FIG. 7 is a schematic diagram of a detailed flow for executing the computer-implemented method of FIG. 6.

With reference to FIG. 7, there is depicted a computer-implemented method performed during a subsequent access to the client service in accordance with a specific implementation of the present technology. It is contemplated that one or more steps of the method illustrated in FIG. 7 may correspond to one or more steps of the method illustrated in FIG. 6.

At step 751, a candidate user may attempt at using at least some feature of the first service via the frontend 710 of the first service. For example, the candidate user may attempt to add an item to a cart of an e-platform service. At step 752, the frontend 710 may request a USUID from a frontend+AM 720 of the second service. In those embodiments where the candidate user is not currently authenticated with the second service (and potentially not currently authorized), steps 752 and 754 may be performed, where authentication of the candidate user may be requested, and login and password may be received by the backend 730 for that purpose. In response, the backend 730 may generate OAuth token (x-token) and send it to the frontend+AM 720 via step 755. In those embodiments, where the user 170 is currently authenticated with the second service (and potentially currently authorized), the frontend+AM 720 already has the OAuth token, and may send a request to get anonymized user info including an indication of the OAuth token and of the SUID (e.g., client ID) associated with the first service at step 756. The backend 730 may generate a JWT token including the USUID and may send it to the frontend+AM 720 at step 757. The JWT token is transmitted to the frontend 710 via step 758 and to the backend 740 of the first service via step 759. At step 760, the backend 740 may be configured to validate the JWT token (e.g., verify the signature encompassed in the JWT token). Optionally, the backend 740 may also be configured to verify that the JWT token and/or the encompassed USUID is valid based on a timestamp. At step 761, the backend 740 may compare the USUID received via the JWT token with a given USUID locally stored from a previous access. It is contemplated that the backend 740 may perform a look up operation on USUIDs locally stored. If there's a match, the user info associated with the matched USUID is provided to the frontend 710 about the user 170 via step 762. If there is no match, at the step 762 information indicative of an anonymous status of the candidate user is provided to the front end 710.

In some embodiments, it is contemplated that the second service and the AM can be said to be part of the same entity (e.g., the second service). IT can be said that the AM may be a part of a client-side portion of the second service.

Figure 8:
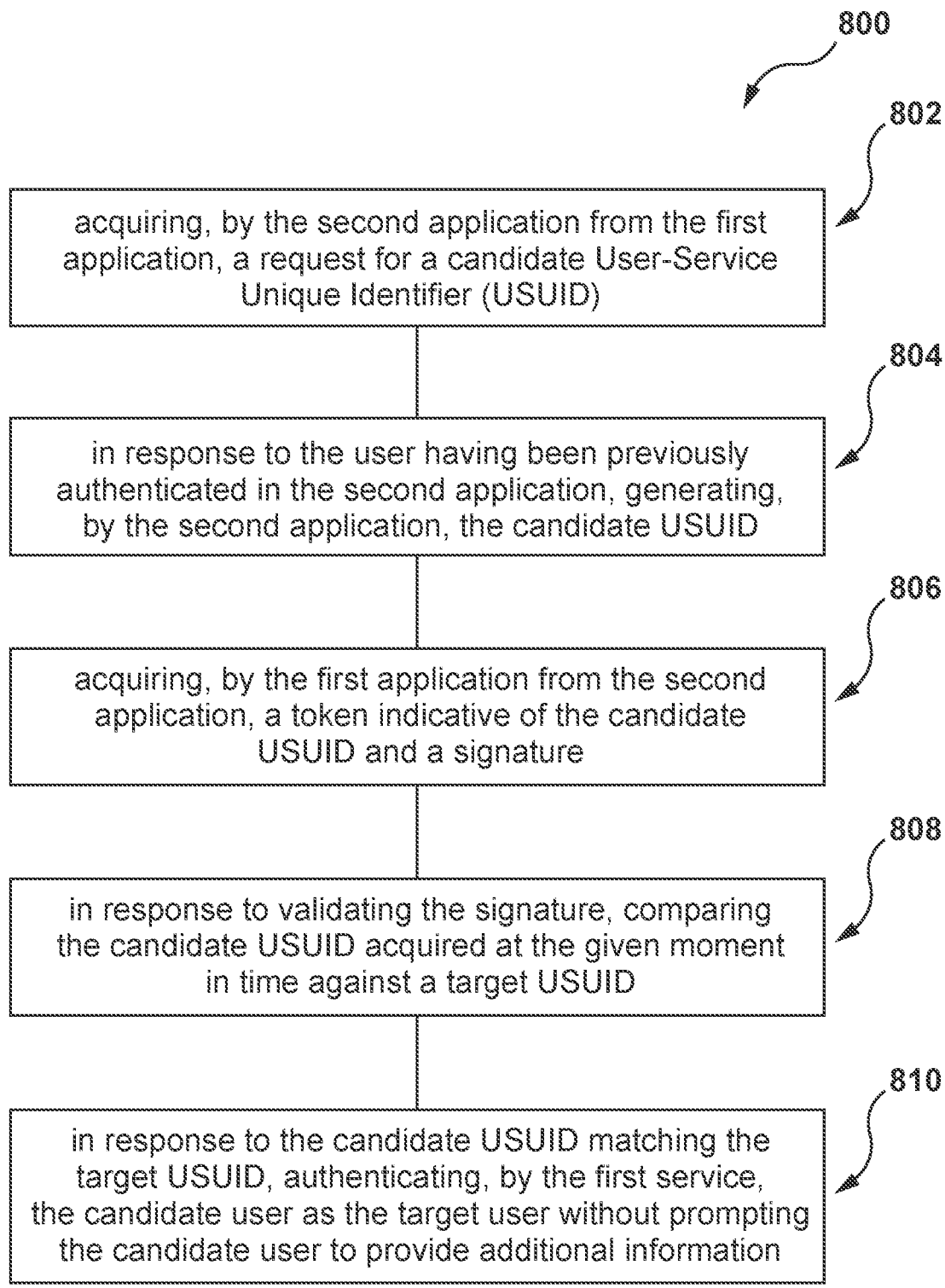
FIG. 8 is a flowchart of a method executed by a system for authenticating a candidate user, in accordance with some embodiments of the present technology.

In some embodiments of the present technology, there is provided a method 800 of authenticating a candidate user. With reference to FIG. 8, various steps of the method 800 will now be described in greater detail.

STEP 802: at a given moment in time, acquiring, by the second service from the first service, a request for a candidate User-Service Unique Identifier (USUID) associated with the candidate user currently attempting to access the first service The method 800 begins at step 802 with the second service, at a given moment in time, acquiring from the first service a request for a candidate USUID associated with a candidate user currently attempting to access the first service.

It should be noted that the first service is associated with a SUID. The SUID is unique to the first service (and/or the publisher of the first service). The candidate USUID is unique for a a pair consisting of the candidate user and the first service (and/or the publisher of the first service).

STEP 804: at a given moment in time, in response to the user having been previously authenticated in the second service, generating, by the second service, the candidate USUID The method 800 continues to step 804 with the second service, at the given moment in time, generating the requested candidate USUID. It should be noted that the candidate USUID may be generated by the second service if the candidate user is currently authenticated and/or has been previously authenticated in the second service. In some embodiments, if the candidate user is not currently authenticated and/or has not been previously authenticated in the second service, the candidate user may be prompted to provide user credentials.

The second service generates the USUID by encrypting (i) user information of the candidate user which authenticates the candidate user in the second service and (ii) the SUID. In some embodiments, the USUID may be generated by encrypting a UUID unique to the candidate user which authenticates the candidate user in the second service and the SUID of the first service. In additional embodiments, the encryption may be performed by an encryption algorithm that uses a secret key, and the SUID as an initialization vector for encrypting the user information.

In one implementation, the encryption process performed by the second service may include encrypting the user information using a first secret key and the SUID as an initialization vector for a GCM algorithm.

STEP 806: at a given moment in time, acquiring, by the first service from the second service, a token indicative of the candidate USUID and a signature The method 800 continues to step 806 with the first service, at a given moment in time, acquiring from the second service a token indicative of the candidate USUID and of a signature. It is contemplated that the second service may generating the signature using a second secret key with a HMAC algorithm.

In some embodiments, the acquired token may be a JWT token having a header portion, a payload portion, and a signature portion. The USUID may be inserted into the payload portion and the signature being inserted into the signature portion. Optionally, a timestamp value may be inserted into the payload portion and which is indicative a period of time during which the candidate USUID is valid and/or the JWT token is valid.

STEP 808: at a given moment in time, in response to validating the signature, comparing the candidate USUID acquired at the given moment in time against a target USUID The method 800 continues to step 808 with the first service, at a given moment in time, in response to validating the signature, comparing the candidate USUID against a target USUID associated with the user 170.

In some embodiments, the first service may be configured to validate the signature in the token by generating a confirmation signature using the secret key and information in the payload. If the confirmation signature matches the signature in the token, the signature is validated. In further embodiments, the first service may perform a look up function for determining whether one of a plurality of locally stored USUIDs match the candidate USUID received via the token. It should be noted that the first service may locally store USUIDs for user's that have previously accessed the first service (directly and/or indirectly).

STEP 810: at a given moment in time, in response to the candidate USUID matching the target USUID, authenticating, by the first service, the candidate user as the target user without prompting the candidate user to provide additional information The method 800 continues to step 810 with the first service, at a given moment in time, in response to the candidate USUID matching the target USUID, authenticating the candidate user as the target user without prompting the candidate user to provide additional information.

For example, let it be assumed that the candidate USUID acquired via the token matches a locally stored USUID associated with user info of the user 170. In this case, the first service authenticates the candidate user as the user 170 and can use the user info associated with the matched USUID for displaying information to the candidate user on the user device.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be examples only rather than limiting. The scope of the present technology is therefore intended to be limited solely by the scope of the appended claims.

The invention claimed is:

1. A method of authenticating a candidate user associated with a first service and a second service, the first service and the second service being executed on respective backend servers, an electronic device of the candidate user being communicatively couplable to the respective back-end servers over a communication network, the method comprising, at a given moment in time:
   acquiring, by the second service from the first service, a request for a candidate User-Service Unique Identifier (USUID) associated with the candidate user currently attempting to access the first service, the first service being associated with a Service Unique Identifier (SUID),
      the candidate USUID being unique for a candidate user-first service pair, the SUID being unique for the first service;
   in response to the candidate user having been previously authenticated in the second service, generating, by the second service, the candidate USUID by encrypting (i) user information of the candidate user authenticating the candidate user in the second service and (ii) the SUID;
   acquiring, by the first service from the second service, a token indicative of the candidate USUID and a signature;
   in response to validating the signature, comparing the candidate USUID acquired at the given moment in time against a target USUID associated with a target user of the first service acquired at an other moment in time, the other moment in time being before the given moment in time; and
   in response to the candidate USUID matching the target USUID, authenticating, by the first service, the candidate user as the target user without prompting the candidate user to provide additional information.

2. The method of claim 1, wherein the target user has been authenticated with the first service at the other moment in time, the target USUID having been stored by the first service in response to authentication at the other moment in time.

3. The method of claim 2, wherein the target user has been authenticated directly with the first service.

4. The method of claim 2, wherein the target user has been authenticated with the first service indirectly in the second service.

5. The method of claim 1, wherein the encrypting comprises encrypting, by the second service, the user information using a first secret key and the SUID as an initialization vector for a Galois/Counter Mode (GCM) algorithm.

6. The method of claim 1, wherein the method further comprises generating, by the second service, the signature using a second secret key with a Hash Message Authentication Code (HMAC) algorithm.

7. The method of claim 1, wherein the token is a JSON Web Token (JWT) having a header portion, a payload portion, and a signature portion, the USUID being inserted into the payload portion and the signature being inserted into the signature portion.

8. The method of claim 7, wherein a timestamp value is further inserted into the payload portion, the timestamps being indicative a period of time during which the USUID is valid.

9. The method of claim 1, wherein the first service and the second service have a same operator.

10. The method of claim 1, wherein an operator of the first service is different from an operator of the second service.

11. A system for authenticating a candidate user associated with a first service and a second service, the first service and the second service of the system being executed on respective backend servers, an electronic device of the candidate user being communicatively couplable to the respective back-end servers over a communication network, the system being configured to:
at a given moment in time:
acquire, by the second service from the first service, a request for a candidate User-Service Unique Identifier (USUID) associated with the candidate user currently attempting to access the first service, the first service being associated with a Service Unique Identifier (SUID),
the candidate USUID being unique for a candidate user-first service pair, the SUID being unique for the first service;
in response to the candidate user having been previously authenticated in the second service, generate, by the second service, the candidate USUID by encrypting (i) user information of the candidate user authenticating the candidate user in the second service and (ii) the SUID;
acquire, by the first service from the second service, a token indicative of the candidate USUID and a signature;
in response to validating the signature, compare the candidate USUID acquired at the given moment in time against a target USUID associated with a target user of the first service acquired at an other moment in time, the other moment in time being before the given moment in time; and
in response to the candidate USUID matching the target USUID, authenticate, by the first service, the candidate user as the target user without prompting the candidate user to provide additional information.

12. The system of claim 11, wherein the target user has been authenticated with the first service at the other moment in time, the target USUID having been stored by the first service in response to authentication at the other moment in time.

13. The system of claim 12, wherein the target user has been authenticated directly with the first service.

14. The system of claim 12, wherein the target user has been authenticated with the first service indirectly in the second service.

15. The system of claim 11, wherein to encrypt comprises the system configured to encrypt, by the second service, the user information using a first secret key and the SUID as an initialization vector for a Galois/Counter Mode (GCM) algorithm.

16. The system of claim 11, wherein the system is further configured to generate, by the second service, the signature using a second secret key in a Hash Message Authentication Code (HMAC) algorithm.

17. The system of claim 11, wherein the token is a JSON Web Token (JWT) having a header portion, a payload portion, and a signature portion, the USUID being inserted into the payload portion and the signature being inserted into the signature portion.

18. The system of claim 17, wherein a timestamp value is further inserted into the payload portion, the timestamps being indicative a period of time during which the USUID is valid.

19. The system of claim 11, wherein the first service and the second service have a same operator.

20. The system of claim 11, wherein an operator of the first service is different from an operator of the second service.

* * * * *